March 20, 1928.
C. F. CHRISTOPHER
MEASURING INSTRUMENT
Filed March 17, 1926
1,663,440
2 Sheets-Sheet 1
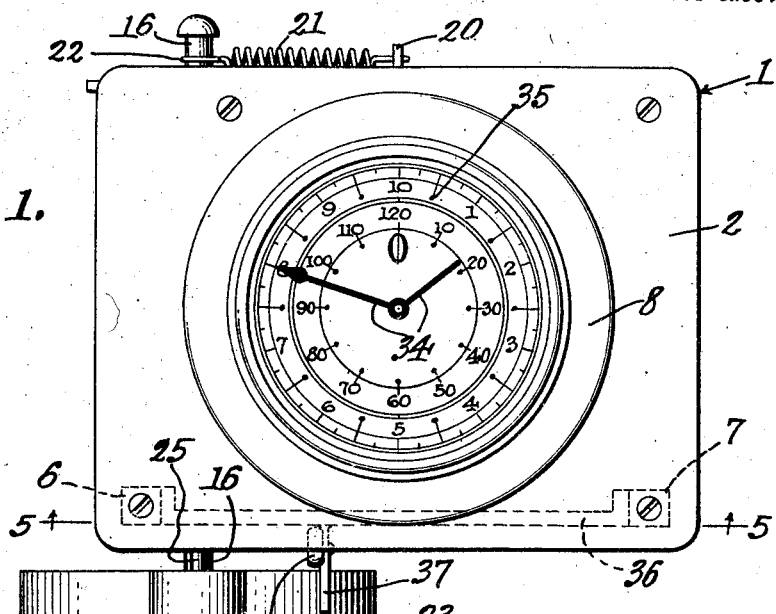
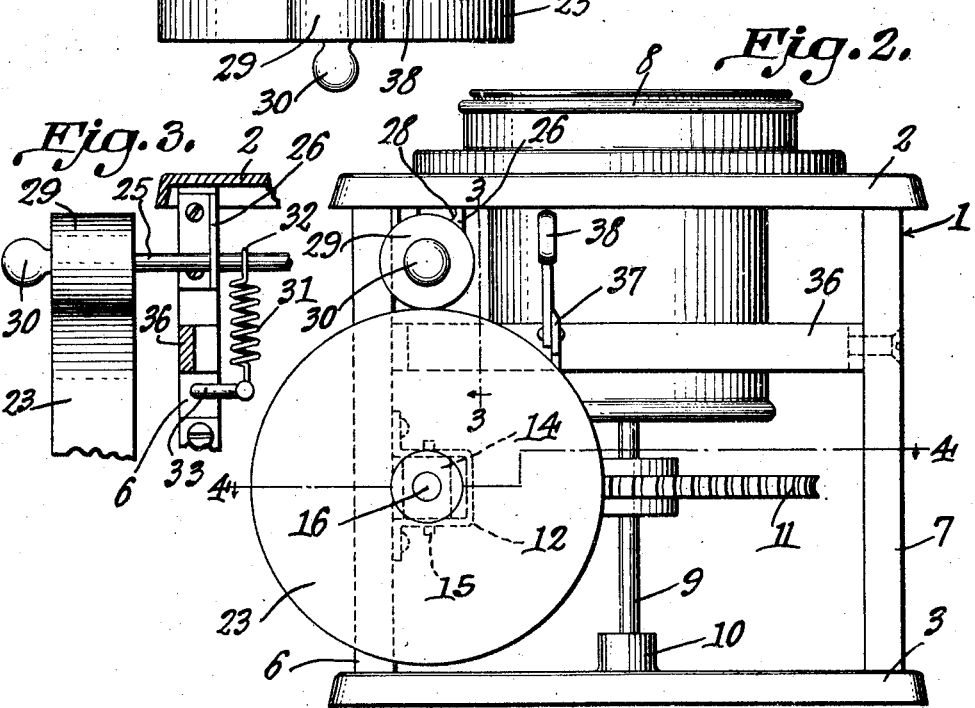
Calvin F. Christopher, Inventor
By C. A. Snow & Co.
Attorneys March 20, 1928.  
C. F. CHRISTOPHER  
MEASURING INSTRUMENT  
Filed March 17, 1926  
1,663,440  
2 Sheets-Sheet 2
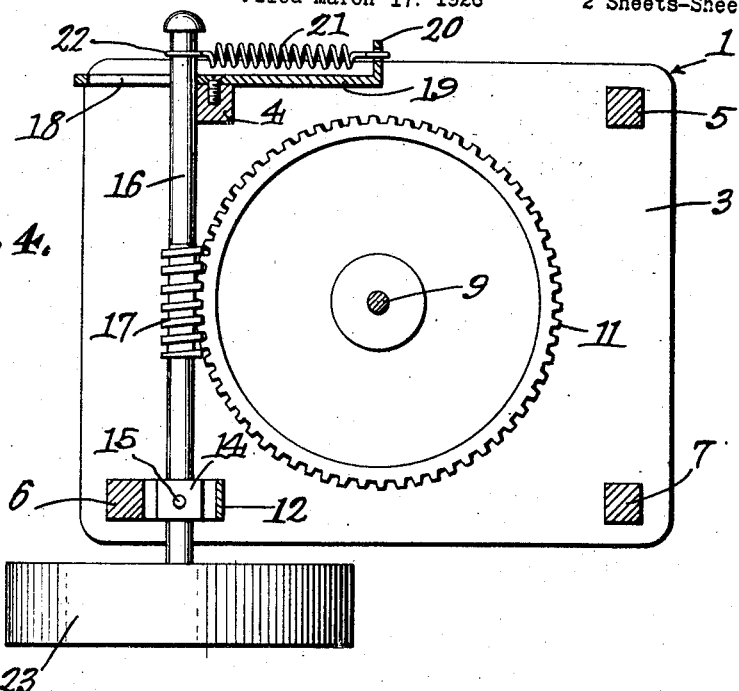
Fig. 4.
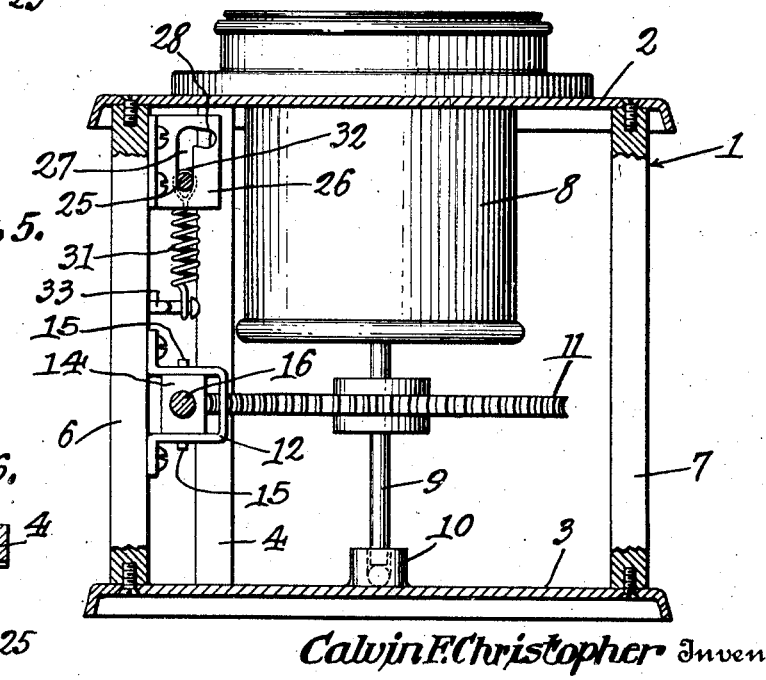
Fig. 5.
Fig. 6.
Calvin F. Christopher, Inventor Patented Mar. 20, 1928.

1,663,440

UNITED STATES PATENT OFFICE.

CALVIN F. CHRISTOPHER, OF CANTON, NORTH CAROLINA.

MEASURING INSTRUMENT.

Application filed March 17, 1926. Serial No. 95,418.

This invention aims to provide novel means whereby the length of a flexible article may be determined, the device being of use not only in measuring cloth, ribbon and the like, but, as well, being of use for measuring the length of a tape, in surveying operations, and for many other purposes, which will suggest themselves readily to the user.

In the drawings, Figure 1 is a top plan; Figure 2 is a side elevation; Figure 3 is a section on the line 3—3 of Figure 2; Figure 4 is a section on the line 4—4 of Figure 2; Figure 5 is a section on the line 5—5 of Figure 1; Figure 6 is a fragmental section showing the mounting for one of the shafts.

The device comprises a frame 1 including a top plate 2 and a bottom plate 3 connected by posts 4, 5, 6 and 7. A register 8 is mounted in the top plate 2 and includes a shaft 9 that is journaled in a bearing 10 on the bottom plate 3. The shaft 9 of the register carries a worm wheel 11.

There is a loop-shaped bracket 12 on the post 6. A bearing 14 is pivotally mounted at 15 in the bracket 12 to turn on an axis. In the bearing 14, a shaft 16 is journaled. The shaft 16 has a worm 17 that meshes with the worm wheel 11. The shaft 16 is mounted for sliding movement in a slot 18 in an arm 19 which is secured intermediate its ends to the post 4, the arm 19 being equipped at its inner end with an outstanding finger 20 to which is attached one end of a retractile spring 21, the other end of the spring 21 terminating in a loop 22 wherein the shaft 16 is journaled. The function of the spring 21 is to hold the worm 17 in mesh with the worm wheel 11, but when it is desired to set the register 8 at zero, the shaft 16 may be swung, to move the worm 17 out of mesh with the worm wheel 11, the bearing 14 pivoting at 15. That end of the shaft 16 which is adjacent to the post 6 carries a large wheel 23.

On the post 4 is mounted an off-set bracket 24 which is shown in Figure 6. A shaft 25 is journaled in the bracket 24. A wing 26 is secured to the post 6. The wing 26 has a vertical slot 27 provided with a lateral seat 28. The shaft 25 is journaled in the slot 27. The shaft 25 carries a small wheel 29, and on the end of the shaft 25 there is a knob 30. A retractile spring 31 is provided, and is equipped at its upper end with a loop 32 wherein the shaft 25 is journaled. The lower end of the spring 31 is connected to an off-set anchor 33 on the post 6. The function of the spring 31 is to pull down the wheel 29 so that the material which is to be measured will be held tightly between the wheels 29 and 23. Whilst the material is being inserted between the wheels 29 and 23, the wheel 29 may be raised, the shaft 25 being swung upwardly by means of the knob 30, the shaft moving upwardly in the slot 27 of the wing 26, and being engaged in the seat 28. The bearing bracket 24 of Figure 6 is thin, and the shaft 25 has considerable length. Therefore, a very small amount of play between the shaft 25 and the bracket 24 will enable the shaft not only to be swung upwardly in the slot 27, but, as well, will permit the shaft to be moved laterally, to engage it in the seat 28.

When the wheels 29 and 23 are in substantially the position shown in Figure 3, but with the material between them, the material may be drawn lengthwise, or the machine may be moved lengthwise of the material, whereupon the wheel 23 will rotate the shaft 16, the worm 17 cooperating with the worm wheel 11 to operate the shaft 9 of the register 8, the hands 34 of the register coacting with the dial 35 of the register in a way which will be understood readily by those skilled in the art.

The parts 6 and 7 are connected by a bar 36 carrying a fixed shear 37 adapted to cooperate with a movable shear 38 to cut off the measured material, should such an operation be desired.

What is claimed is:—

1. A measuring device comprising a frame, a register carried by the frame and including a shaft, a worm wheel on the register shaft, a second shaft, a worm on the second shaft, and meshing with the worm wheel, means for mounting the second shaft at a point intermediate its ends, for swinging movement, thereby to disengage the worm from the worm wheel and to permit the register to be reset, means cooperating with one end of the second shaft to hold the worm engaged with the worm wheel, a worm on the opposite end of the second shaft, a third shaft, a wheel on the third shaft and cooperating with the wheel on the second shaft to engage the material which is to be measured, means for mounting the third shaft for radial swinging movement in a plane approximately at right angles to the plane in which the second shaft swings, thereby to permit the wheel on the third shaft to be spaced from the wheel on the second shaft, and means cooperating with the third shaft to hold the wheel of the third shaft in engagement with the wheel on the second shaft, and out of engagement with the wheel on the second shaft, at the will of an operator.

2. A measuring device comprising a frame, a register carried by the frame and including a shaft, a worm wheel on the register shaft, a second shaft, a worm on the second shaft, and meshing with the worm wheel, means for mounting the second shaft for swinging movement, thereby to disengage the worm from the worm wheel and to permit the register to be reset, means cooperating with the second shaft to hold the worm engaged with the worm wheel, a wheel on the second shaft, a third shaft, a wheel thereon and cooperating with the wheel on the second shaft to engage the material which is to be measured, means for mounting the third shaft for swinging movement, thereby to permit the wheel on the third shaft to be spaced from the wheel on the second shaft, spring means cooperating with the third shaft to hold the wheels on the second and third shafts in coacting relation with respect to the material to be measured, and a member on the frame, said member having an opening wherein the third shaft moves as it is swung, aforesaid, said member having a seat wherein the third shaft may be engaged to hold the wheels of the second and third shafts spaced.

In testimony that I claim the foregoing as my own, I have hereto affixed my signature.

CALVIN F. CHRISTOPHER.